United States Patent [19]

Modena et al.

[11] 3,870,689

[45] Mar. 11, 1975

[54] CRYSTALLINE COPOLYMERS OF ETHYLENE AND TETRAFLUOROETHYLENE HAVING HIGH WORKABILITY CHARACTERISTICS

[75] Inventors: Mario Modena, Bollate; Mario Ragazzini, Milan; Giancarlo Borsini, Rome; Marco Valera, Milan, all of Italy

[73] Assignee: Montecatini Edison S.p.A., Milan, Italy

[22] Filed: Aug. 16, 1973

[21] Appl. No.: 388,910

Related U.S. Application Data

[63] Continuation of Ser. No. 143,637, May 14, 1971, abandoned, which is a continuation-in-part of Ser. No. 730,190, May 17, 1968, abandoned.

[52] U.S. Cl. .................... 260/87.5 B, 117/161 UZ
[51] Int. Cl. .................... C08f 1/06, C08f 15/02
[58] Field of Search ................................ 260/87.5 B

[56] References Cited
UNITED STATES PATENTS 2,468,664  4/1949  Hanford et al. ..................... 260/86
3,528,954  9/1970  Carlson ......................... 260/88.3 R
3,738,923  6/1973  Carlson et al. ................. 260/87.5 B

*Primary Examiner*—H. S. Cockeram

[57] ABSTRACT

Crystalline copolymers of ethylene and tetrafluoroethylene of high thermal stability characteristics in the molten state and high resistance to oxidation under heat, having a contact in tetrafluoroethylene from 53 to 63% in moles, homogeneously distributed along the chain axis and among the chains characterized in that the temperature gap between their ultimate melting temperature and the temperature at which oxidative decomposition of the copolymers begins is at least 80°C. They are prepared by polymerization of monomers mixtures having a content in tetrafluoroethylene greater than 78% in moles.

The copolymers can be used as plastic materials and are particularly useful since said temperature gap of at least 80°C permits the processing thereof, and the reprocessing of scraps, to useful manufactured articles, conveniently and economically and by conventional techniques.

2 Claims, No Drawings

CRYSTALLINE COPOLYMERS OF ETHYLENE AND TETRAFLUOROETHYLENE HAVING HIGH WORKABILITY CHARACTERISTICS

This is a continuation-in-part of our application Ser. No. 730,190, filed on May 17, 1968 (now abandoned), and a continuation of our application Ser. No. 143,637 filed May 14, 1971 (now abandoned), in which we disclosed crystal-line polymeric materials with high workability characteristics, constituted by copolymers of ethylene and tetrafluoroethylene with a content in tetrafluoroethylene varying from 53 to 63% by moles.

THE PRIOR ART

It is known that polytetrafluoroethylene, although having good characteristics such as a high melting temperature, a high stability to all chemical agents, even at a high temperature, as well as a very low friction difficult is difficular to process by conventional transforming techniques (extrusion, injection moulding and the like) and special techniques are required.

The copolymers of tetrafluoroethylene and ethylene of the known types do not have altogether satisfactory thermal stability characteristics in the molten state and show a poor resistance to ageing in the air and at high temperatures below their melting point. As a matter of fact, such copolymers, after having been exposed to the action of air at high temperatures (150°–200°C) already after a few days show a degrading of their mechanical characteristics (tensile strength, elongation at break, etc.) of such a degree as to discourage their use in those applications which require a good preservation of the mechanical characteristics also after their use at a high temperature for long periods of time.

It is also commonly accepted that tetrafluoroethylene-ethylene copolymers having high tetrafluoroethylene content possess high melting points and are untractable or very difficult to be processed in that the difference between the flow temperature and the thermal-deterioration starting temperature is small (U.S. Pat. No. 3,445,434 page 1, column 2, lines 67–72 and Brit. Pat. No. 1,024,351, page 1, lines 35–65).

Thus, an object of this invention is that of providing crystalline polymeric materials containing fluorine which are free of the drawbacks previously described.

Other objects will appear hereinafter.

These objects are accomplished by means of copolymers of ethylene and tetrafluoroethylene which, according to this invention, are characterized by a content in tetrafluoroethylene, homogeneously distributed along the polymeric chain and among the chains, varying from 53 to 63% moles.

The materials according to this invention are crystalline products with a melting point surprisingly decreasing, and a decomposition temperature conversely, increasing, as the final content in tetrafluoroethylene increases. Thus, the most outstanding and distinguishing characteristic of the present thermally stable and oxidation-resistant crystalline copolymers of ethylene and tetrafluoroethylene containing an amount of tetrafluoroethylene in the specific range from 53 to 63% by moles homogeneously distributed along the polymeric chain axis and among the chains is the temperature gap between the ultimate melting temperature of the copolymers and the temperature at which oxidative decomposition of the copolymers begins. The temperature gap is 80°C or more. (The measurement method is described in example 6).

The gap between the ultimate melting temperature and the temperature at which oxidative decomposition sets in is of great practical importance in the commercial use of tetrafluoroethylene/ethylene copolymers. It is at the temperatures in the range between ultimate melting of the copolymers and the onset of oxidative decomposition that the copolymers can be processed to useful manufactured articles by conventional shaping techniques, including extrusion and injection molding. The temperature gap must be sufficient to permit obtaining the manufactured shaped articles and the reprocessing of scraps. It is actually the wide temperature gap as hereinbefore defined that allows the materials according to this invention to exhibit a particularly high thermal stability at the processing conditions. As a matter of fact, their melt-flow index sufers only small variations, even after repeated extrusion at temperatures considerably higher than the melting point of the copolymer.

The whole of these characteristics makes it surprisingly possible to easily work these polymeric materials with the normal conventional techniques and on the usual equipment normally used for the common thermoplastic materials such as polyethylene, polyvinyl chloride and the likes.

These materials are furthermore characterized by a particularly high resistance to oxidation. In fact, samples of these materials subjected to oxidation tests by air at 150°–200°C show a very low degrading of the mechanical characteristics, so much so as to allow the use of these moulded objects also for those applications for which resistance to high temperatures and resistance to oxidation are required.

On the contrary, the polymeric materials according to the prior art, with an average content in tetrafluoroethylene different from that foreseen by the present invention, do not possess such properties as to be easily workable, nor such a good thermal stability as to be employed under heavy temperature conditions.

It has been found in fact, as it will be apparent from the examples, that the melting temperature of the tetrafluoroethylene/ethylene copolymers increases with increase of the tetrafluoroethylene content at values below 50 moles percent, and decreases with increase in the tetrafluoroethylene content at values above 50 moles percent, and that the oxidative decomposition temperature is substantially independent of the composition of the copolymers when the tetrafluoroethylene content is less than 46 moles percent, and vice versa, increases when the tetrafluoroethylene content is higher than 46 moles percent. More particularly, it has been found that the content of from 53 to 63% by mols of tetrafluoroethylene in the present products, is critical to obtaining the copolymers showing a difference of 80°C or more between the ultimate melting temperature and the temperature at which the oxidation decomposition starts.

The copolymers according to this invention may be used for those applications, such as pipe lines for corrosive liquids and organic solvents, gaskets, mechanical parts, electrical insulations and coatings, which must be used at high temperatures and/or in the presence of chemical reactants and solvents.

A particularly advantageous use of the copolymers according to this invention is represented by the transformation into films and fibers of high characteristics.

The copolymers according to this invention are obtained by the copolymerization of starting monomeric mixtures having contents in tetrafluoroethylene greater than 78% moles and the composition of which is maintained constant during the copolymerization reaction by means of appropriate monomer additions.

It has been found, in fact, as will be apparent from the examples hereinbelow, that when a starting monomeric mixture having a lower tetrafluoroethylene content is subjected to copolymerization, copolymers are obtained wherein the mol percent content of copolymerized units of tetrafluoroethylene is outside the lower limit of the defined and critical, molar percent range of the present copolymers.

Other characteristics of the copolymers of this invention will also be evident from the following examples which are given to illustrate the invention and are not intended to be limiting.

EXAMPLE 1

An ethylene/tetrafluoroethylene copolymer of a known type containing 44% moles of tetrafluoroethylene was prepared. A stainless steel autoclave of 6 litres capacity, equipped with a stirrer and a thermostabilizing sleeve was emptied of oxygen by means of repeated washings with nitrogen. In this autoclave were then introduced in this order:

```
150  g distilled water
3000 g tetriary butyl alcohol
500  g tetrafluoroethylene
130  g ethylene
0.5  g ammonium persulphate dissolved in 150 g of water.
```

The starting monomeric mixture contains, thus, 55% moles of tetrafluoroethylene and 45% moles of ethylene. The reaction mixture was then heated up to 65°C while the pressure attained 28 kg/cm².

After 2 hours the autoclave was cooled down and then opened. The polymer was washed with boiling water, filtered and dried.

In this way were obtained 139 g of a copolymer having the characteristics recorded on the following Table I.

TABLE 1

| | | |
|---|---|---|
| Contents in tetrafluoroethylene | (1) | 44 % moles |
| Optical melting point | (2) | 269°C |
| Tensile strength | (3) | 485 kg/cm² |
| Elongation at break | (3) | 307 % |
| Melt-flow index at 330°C | (4) | 0.9 g/10 min. |
| Melt-flow index at 300°C | (4) | 0.4 g/10 min. |
| Torsional modulus at 23°C | (5) | 4.5 10⁹ dine/cm² |
| Temperature at which the torsional modulus is equal to 1.10⁸ dine/cm² | (5) | 228°C |
| Infrared spectrum | (6) | see FIG. 1 |

(1) Elementary carbon analysis
(2) Disappearance of double refraction ASTM D2117-62-T
(3) ASTM D 1708-59 T stretch rate 5 cm/min
(4) ASTM D 1238-65 T applied load = 6 kg/cm²
(5) Dynamic-mechanical measurements; frequence = 1 cycle/sec.
(6) Measurements carried out on a film (with Perkin-Elmer Mod. 21 spectrophotometer having a prism of NaCl).

Samples of this copolymer were prepared according to the procedures described by the ASTM D 1708-59 T rules, which samples were then submitted to artificial ageing through heating in an airflow oven at 190°C for 30 days.

The samples thus treated showed the following mechanical characteristics:

| | Initial | after ageing |
|---|---|---|
| Tensile strength in kg/cm² | 485 | 295 |
| Elongation at break % | 307 | 61 |

The above reported data show that the copolymers according to the known technique, after 30 days of ageing in an oven presented a very marked degrading of the mechanical characteristics.

EXAMPLE 2

Into the same reactor as that described in Example 1 were continuously fed in a mixture of monomers containing 79% of tetrafluoroethylene and 21% of ethylene and a mixture of 480 cc/h of water and 3520 cc/h of tertiary butyl alcohol.

The mixture water/tert. butyl alcohol contains dissolved 100 mg/l of a mixture of ammonium persulphate.

The reaction temperature was maintained at 65°C, while the pressure amounted to 40 kg/cm².

The average reaction time was 1 hour.

From the reactor was continuously drawn the polymer, which was washed, filtered and dried.

In this way were obtained 440 g/h of polymer which showed the characteristics reported on the following Table II:

TABLE II

| | |
|---|---|
| Contents in tetrafluoroethylene | 53 % moles |
| Optical melting point | 277°C |
| Tensile strength | 465 kg/cm² |
| Elongation at break | 322 % |
| Melt-flow index at 330°C | 6.0 g/10 min. |
| Infrared spectrum | see FIG. 2 |

Samples of this copolymer, prepared as described in Example 1, were subjected to artificial ageing in an airflow oven at 190°C for 30 days.

After this ageing the samples of copolymer showed the following mechanical characteristics:

| | Initial | After ageing |
|---|---|---|
| Tensile strength in kg/cm² | 465 | 435 |
| Elongation at break in % | 322 | 334 |

Other samples were subjected to artificial ageing in an airflow oven at 190°C for 60 days. After this ageing the samples showed the following characteristics:

| | Initial | After ageing |
|---|---|---|
| Tensile strength in kg/cm² | 465 | 444 |
| Elongation at break in % | 322 | 378 |

From this artificial ageing test it appears quite clearly that the copolymers according to the invention suffer only very slight variations of the mechanical properties even after long resting times in the air-flow oven at 190°C. This means that the materials according to this invention show a very good resistance to the combined action of air and heat, far much superior to that of the copolymers obtained according to the prior art.

EXAMPLE 3

Into the reactor described in Example 1 were continuously fed in a mixture of monomers containing 81% of tetrafluoroethylene and 19% of ethylene and a mixture of 400 cc/h of water and 3600 cc/h of tertiary butyl alcohol. This water/tertiary butyl alcohol mixture contained dissolved in it 67 mg of ammonium persulphate for each litre of mixture.

The reaction temperature was maintained at 62°C while the pressure amounted to 42 kg/cm². The average or mean reaction time was 1 hour.

From the reactor is continuously drawn the polymer which is then washed, filtered and dried.

In this way were obtained 154 g/h of polymer which showed the characteristics reported on the following Table III.

TABLE III

| | |
|---|---|
| Contents in tetrafluoroethylene | 56 % in moles |
| Optical melting point | 274°C |
| Tensile strength | 478 kg/cm² |
| Elongation at break | 303 % |
| Melt-flow index at 300°C | 5.0 g/10 min. |
| Melt-flow index at 330°C | 9.0 g/10 min. |
| Infrared spectrum | see FIG. 3 |

Samples of this copolymer, prepared as described in Example 1, were subjected to artificial ageing in an airflow oven at 190°C for 30 days.

After this ageing the samples showed the following mechanical characteristics:

| | Initial | After ageing |
|---|---|---|
| Tensile strength in kg/cm² | 478 | 412 |
| Elongation at break in % | 303 | 313 |

Other samples were subjected to an artifical ageing test in an airflow oven at 190°C for 60 days. After ageing the samples showed the following mechanical characteristics:

| | Initial | After ageing |
|---|---|---|
| Tensile strength in kg/cm² | 478 | 396 |
| Elongation at break in % | 303 | 318 |

From all the above data it can be deduced that the copolymers according to the invention show a good resistance to the combined action of air and heat.

The polymer prepared as described further above was maintained for 2 hours under a plate press at 330°C; after this treatment the melt-flow index at 300°C amounted to 5.8 g/10 minutes.

The polymer was extruded 5 times in a Plastograph Brabender extruder at 300°C; after this treatment showed the following mechanical characteristics:

| | Initial | After treatment |
|---|---|---|
| Tensile strength in kg/cm² | 478 | 466 |
| Elongation at break in % | 303 | 278 |

A copolymer similar to the preceding one and having a contents in tetrafluoroethylene of 55% in moles, showing a melt-flow index of 4.4 g/10 min. at 330°C and of 2.2 at 300°C, was extruded 10 times at 330°C on the melt-flow index apparatus described in Example 1; after this treatment the copolymer showed a melt-flow index of 5.4 g/10 minutes at 330°C.

The same copolymer was granulated in a Bandera extruder of the type 30 mm $\phi$ L/D 17 at a temperature of 325°C and showed the following characteristics:

| | |
|---|---|
| Tensile strength in kg/cm² | 492 |
| Elongation at break in % | 288 |
| Melt-flow index at 300°C g/10 min. | 2.2 |

After 10 extrusions in the Brabender Plastograph at 330°C the copolymer showed the following characteristics:

| | |
|---|---|
| Tensile strength in kg/cm² | 480 |
| Elongation at break in % | 275 |
| Melt-flow index at 300°C g/10 min. | 2.8 |

All these tests showed that the copolymers according to this invention presented an excellent resistance to ageing and an excellent thermal stability.

EXAMPLE 4

In a stainless steel autoclave of 6000 cc capacity, provided with a stirrer and a thermostabilizing sleeve, and freed of the oxygen by repeated washings with nitrogen, a mixture was subjected to polymerization which was constituted by:

| | | |
|---|---|---|
| 400 | g | of distilled water |
| 2900 | g | of tertiary butyl alcohol |
| 1320 | g | of tetrafluoroethylene |
| 76 | g | of ethylene |
| 0.2 | g | of ammonium persulphate. |

The mixture of starting monomers thus contained 83% moles of tetrafluoroethylene and 17% moles of ethylene. The reaction mixture was heated up to 65°C while the pressure grew to 38 kg/cm².

After 1 hour of reaction the autoclave was cooled down and opened, the polymer was washed with boiling water, was filtered and then dried.

There were obtained 150 g of a copolymer having the properties reported by the following Table IV:

TABLE IV

| | |
|---|---|
| Contents in tetrafluoroethylene | 58% in moles |
| Optical melting point | 270°C |
| Tensile strength | 442 kg/cm² |
| Elongation at break | 317% |
| Melt-flow index at 300°C | 7.5 g/10 minutes |
| Torsional modulus at 23°C | 3.7 10⁹ dine cm² |
| Temperature at which the torsional modulus is equal to 1.10⁸ dine/cm² | 235°C |
| Infrared spectrum | see FIG. 4 |

Samples of the polymer thus prepared were subjected to successive extrusions in a Brabender Plastograph extruder; after 10 extrusions at 330°C the polymer showed the following characteristics:

| | Initial | After extrusion |
|---|---|---|
| Tensile strength in kg/cm² | 442 | 440 |
| Elongation at break in % | 317 | 260 |
| Melt-flow index at 300°C g/10 min. | 7.5 | 7.5 |

As can be seen from the above data the copolymer maintains practically unaltered the tensile strength and the melt-flow index, while it shows a modest variation of elongation at break. This stands to prove the high resistance characteristics of the copolymer under the conditions at which it can be transformed into manufactured articles.

EXAMPLE 5

Into the reactor described in Example 1 were continuously fed in a mixture of monomers containing 90% moles of tetrafluoroethylene and 10% moles of ethylene, and a mixture of 360 cc/h of water and 2640 cc/h of tertiary butyl alcohol containing dissolved in it 50 mg of ammonium persulphate for each liter of mixture.

The temperature of reaction was maintained at 65°C and the pressure was kept at 60 kg/cm². The average reaction time was 1 hour.

From the reactor the polymer was continuously drawn out, washed, filtered and dried. Thereby were obtained 280 g/h of copolymer which showed the characteristics recorded in the following Table V:

TABLE V

| | |
|---|---|
| Contents in tetrafluoroethylene | 60 % in moles |
| Optical melting point | 264°C |
| Tensile strength | 382 kg/cm² |
| Elongation at break | 339 % |
| Melt-flow index at 270°C | 4.1 g/10 min. |
| Melt-flow index at 330°C | 15.6 g/10 min. |
| Infrared spectrum | see FIG. 5 |

Samples of this polymer prepared as described in Example 1 were subjected to artificial ageing in an airflow oven at 190°C for 30 days. After this ageing the sample showed the following mechanical characteristics:

| | Initial | After ageing |
|---|---|---|
| Tensile strength in kg/cm² | 382 | 317 |
| Elongation at break % | 339 | 391 |

From the above reported data it will be seen that the copolymer shows a good resistance to the combined action of air and heat.

In order to evaluate the stability of the copolymers, the copolymers prepared according to the preceding examples were subjected to 5 successive extrusions in an apparatus for determination of the melt-flow index according to the rules of ASTM D 1238 – 65 T. (applied load), 6 kg/cm²) at a temperature of about 80°C above the optical melting point of the polymer and the following data of melt-flow index were obtained, expressed as grams of polymer extruded in 10 minutes.

It is assumed that the stress conditions which the copolymer undergoes during the above reported test which consisted in 5 extrusions on the melt-flow index apparatus at a temperature of 80°C greater than the optical melting point of the copolymer, may be considered comparable to the stress conditions which the copolymer undergoes during the processing of the copolymer (extrusion, moulding, etc.).

As is known, the melt-flow index is generally considered as an index inversely proportional to the molecular weight of the polymer. Thus, an increase of the melt-flow index is interpreted as a decrease of the molecular weight attributable to a degradation phenomenon caused by the prolonged heating at a high temperature which, in this particular case, is about 80°C higher than the optical melting point of the copolymer.

From the above reported table it can be seen how the copolymers of this invention show a very low increase of the melt-flow index, that is, not greater than 30%. The copolymers according to the prior art represented by the copolymer at 44% in moles of tetrafluoroethylene described in Example 1, show a considerable increase of the melt-flow index. It can thus be remarked that the copolymers according to this invention show a stability during the forming or moulding processes far greater than that of the copolymers of the prior art.

In order to evaluate by an alternative method to the preceding one of the stability characteristics during forming, the copolymers prepared as described herein above, were subjected to 10 successive extrusions in the above specified melt-flow index apparatus at a temperature of 330°C. The following results were obtained:

| % Contents in moles of tetra-fluoro ethylene | Melt-flow index at the first extrusion | Melt-flow index at the tenth extrusion | % variation of the melt-flow index |
|---|---|---|---|
| 44 | 0.9 | 1.5 | +66.8 |
| 53 | 6.0 | 8.4 | +40 |
| 55 | 4.4 | 5.4 | +22.7 |
| 56 | 9.0 | 11.0 | +22.3 |
| 60 | 15.6 | 18.15 | +16.4 |

Also this method brings into evidence the superiority of the thermal stability of the copolymers according to the invention in comparison to the copolymers prepared according to the prior art.

The infrared spectra of comparison moulded films of the copolymers described in examples 1–5 have been registered with a Perkin-Elmer Mod 21 double beam spectrophotometer (prism : NaCl; resolution : 9,27;

| Example | % contents in moles of tetrafluoro-ethylene | optical melting point °C | extrusion temperature in °C | Melt-flow index on the 1st extrusion | Melt-flow index on the 5th extrusion | % variation of melt-flow index |
|---|---|---|---|---|---|---|
| 1 | 44 | 269 | 350 | 0.97 | 1.65 | +70 |
| 2 | 53 | 277 | 360 | 15.5 | 18.8 | +21.4 |
| 3 | 56 | 274 | 355 | 14.89 | 17.96 | +20.6 |
| 4 | 58 | 270 | 350 | 18.9 | 19.9 | + 5.3 |
| 5 | 60 | 264 | 345 | 17.05 | 19.12 | +12.1 | gain 5.8; pen traverse time: 3 seconds; response : 1) and are shown in the scans obtained.

The infrared spectrum bands which show the sequences of the —$CH_2$— groups are located in correspondence with the frequencies:

773 $cm^{-1}$ whose intensity is proportional to the number of (—$CH_2$—)$_2$ groups 733 $cm^{-1}$ whose intensity is proportional to the number of (—$CH_2$—)$_4$ groups 721 $cm^{-1}$ whose intensity is proportional to the number of (—$CH_2$—)$_n$ groups with $n > 4$.

For each copolymer it is thus possible to calculate the ratio between the absorbances of the bands:

| Molar % of tetrafluoroethylene in the copolymer | $\frac{(\log Io/I)\ 733}{(\log Io/I)\ 773}$ | $\frac{(\log Io/I)\ 721}{(\log Io/I)\ 773}$ |
| --- | --- | --- |
| 44 | 0.9 | 0.7 |
| 53 | <0.15 | <0.15 |
| 56 | <0.15 | <0.15 |
| 58 | <0.15 | <0.15 |
| 60 | <0.15 | <0.15 |

From the above listed data it can be seen that in the copolymers according to this invention, that is, having a content in tetrafluoroethylene comprised between 53% and 63% the sequences (—$CH_2$—)$_n$ with $n>4$ and those with (—$CH_2$—)$_4$ are present in very reduced quantities and are by far inferior to those present in the copolymers according to the prior art. Furthermore, in the copolymers according to the invention, the sequences (—$CH_2$—)$_2$ are present in a greater number.

This actually means that the copolymers according to the invention have a more homogeneous structure and that the ethylene molecules are more regularly distributed along the axis of the polymeric chain.

EXAMPLE 6

This example illustrates in section (a) the preparation of an ethylene/tetrafluoroethylene copolymer according to prior art, in section (b) the preparation of a group of copolymers having an increasing content of $C_2F_4$ % by mols, and then presents a comparison of the characteristics of the copolymers prepared in (a) and (b):

(a) A stainless steel high pressure reactor having a capacity of about 2800 parts by volume was flushed with tetrafluoroethylene and then 175 parts of deoxygenated water, 1225 parts of tertiary butyl alcohol, and 1.05 parts of ammonium persulphate were charged into said reactor. Thereafter the reactor was closed and evacuated, then charged with a mixture of tetrafluoroethylene and ethylene having a mol ratio of 1:0.82 as determined by gas chromatographic analysis. The contents of the reactor were stirred and heated at 50°C while maintaining an internal pressure of 25 kg/cm² (about 350 lbs/sq.in.) by the periodic injection of the tetrafluoroethylene/ethylene mixture; the heating and stirring were continued for 1.5 hours, and then the reactor was cooled, the pressure released and the product discharged, obtaining an ethylene/tetrafluoroethylene copolymer in the form of a thick slurry which was coagulated by steam distillation, washed and dried. 120 parts of ethylene/tetrafluoroethylene copolymer were obtained and the copolymer was found to contain 38.6% of carbon corresponding to a tetrafluoroethylene to ethylene mol ratio of 47.5 : 52.5 percent.

(b) A group of tetrafluoroethylene-ethylene copolymers containing from 36 to 63 moles per cent of tetrafluoroethylene were synthetized under the conditions disclosed in Table VI.

The infrared spectra of compression molded films of the samples obtained as described in (a) and (b) above have been registered as above described (page 18). Film thickness has been selected to give an absorbance value of the band at 773 $cm^{-1}$ comprised between 0.04 and 0.15.

The ratios between the absorbances of the band at 773 $cm^{-1}$ are reported in Table VII. Said ratios are affected by a 30% error.

Samples of the copolymers obtained as described in (a) and (b) above, in powder form, were analyzed twice with a Du Pont 900 Thermal Analyzer, using a Du Pont D S C cell (Catalog No. 900600) and standard aluminum sample holders, in which analysis the reference was an empty standard sample holder, the heating rate was 15°C/minute, the abscissa scale was 50°C/inch and the ordinate scale was 0.2°C/inch. The runs were carried out in static air atmosphere, and the starting temperature was room temperature. The samples, as described above are shown wherein:

the thermogram of the copolymer of Run(b) 1 of Table I containing 36 % by moles of $C_2F_4$;

the thermogram of the copolymer of Run (b) 2 of Table I containing 46% of moles of $C_2F_4$;

the thermogram of the copolymer of Run (b) 3 of Table I containing 48 % by moles of $C_2F_4$;

the thermogram of the copolymer of Run (b) 4 of Table I containing 51 % by moles of $C_2F_4$;

the thermogram of the copolymer of Run (b) of Table I containing 55 % by moles of $C_2F_4$;

the thermogram of the copolymer of Run (b) 6 of Table I containing 63% by moles of $C_2F_4$;

the thermogram of the copolymer of the Run of Example 6 (a) of Table 2 containing 47.5% by moles of $C_2F_4$.

The temperature values reported on the abscissa shown in said thermograms are uncorrected values: the temperature values of the single points reported in the diagram obtained have been corrected using the Chromel-Alumen tables supplied with the instrument. The thermograms show an en dothermic peak ascribed to the melting process and an exothermic slope ascribed to an oxidative decomposition process.

The reproducibility of the melting temperature was within 1°C, for the oxidative decomposition onset temperature was about 3°C.

The data demonstrated by said thermograms are shown in Table VIII The data tabulated in the third and fourth columns of Table VII combined with the data referring to the tetrafluoroethylene content by moles percent in the polymer that are shown in the last column of Table VI show that the maximum melting temperature and the end of melting temperature of the tetrafluoroethylene/ethylene copolymers increase with increase in the tetrafluoroethylene content at values below 50 moles percent and decrease with increase in the tetrafluoroethylene content at values above 50 moles percent. On the other hand, the data for the oxidative decomposition onset temperature appearing in the fifth column of Table VIII show that the decomposition temperature is substantially independent of the composition of the copolymers when the tetrafluoroethylene content is less than 46 moles percent, and increases when the tetrafluoroethylene content is higher than 46 moles percent.

The differences in melting temperature and decomposition temperature characteristics due to the tetrafluoroethylene content in moles percent in the copolymers shown that the gap between the values of the ultimate melting temperature and the temperature at which oxidative decomposition of the copolymer sets in increases with increase in the tetrafluoroethylene content of the copolymer above 46% by moles and is optimum, greater than 80°C, for the copolymers according to this invention and containing from 53 to 63% by moles of tetrafluoroethylene as it can be seen from the data of the last colume of Table VIII.

On the other hand, copolymers containing 46% by mols or less of tetrafluoroethylene display the behaviour that in the prior art was believed to be common to all tetrafluoroethylene-ethylene copolymers. In said copolymers containing 46% by mols or less of tetrafluoroethylene, the gap decreases with increase in the tetrafluoroethylene content. This is more apparent from the curve obtained when the difference between the end of the melting temperature range and the temperature at which the oxidative decomposition of the copolymers begins is plotted against the mole percent of the tetrafluoroethylene in the copolymer.

From the above data in the thermographs, in Table VI and VII, and the curves referred to, it is apparent that the tetrafluoroethylene/ethylene copolymers of this invention are entirely different from the known ethylene/tetrafluoroethylene copolymers.

TABLE VI

| Run | Initial monomer composition $C_2F_4$ moles % | monomer feed composition $C_2F_4$ moles % | pressure kg/cm$^2$ | $K_2S_2O_8$ grams | $CCl_3F$ ml | $C_2ClF_3$ ml | time hrs. | final latex polymer content % weight | Polymer carbon content % weight | $C_2F_4$ moles % |
|---|---|---|---|---|---|---|---|---|---|---|
| 1 | 15 | 35 | 36 | 10.5 | 240 | 0 | 4 | 14 | 44.6 | 36 |
| 2 | 35 | 45 | 40 | 7 | 70 | 130 | 3 | 20 | 39.4 | 46 |
| 3 | 84 | 50 | 22 | 7 | 30 | 170 | 3.5 | 17 | 30.3 | 48 |
| 4 | 66 | 51 | 21 | 7 | 240 | 0 | 3 | 18 | 37.1 | 51 |
| 5 | 80 | 55 | 20 | 1.75 | 100 | 100 | 3 | 23.5 | 35.5 | 55 |
| 6 | 94 | 62 | 14 | 1.75 | 50 | 150 | 3.75 | 21 | 32.5 | 63 | autoclave capacity 6.7 litres
water 3.3 litres
sodium perfluoro-octanoate 7 g
reaction temperature 75°C

TABLE VII

| Sample Run number from Table VI Example 6(b) | (log Io/I) 733/(log Io/I) 773 | (log Io/I) 721/(log Io/I) 773 |
|---|---|---|
| 1 (*) | 5.0 | 4.5 |
| 2 | 1.2 | 0.8 |
| 3 | 0.35 | <0.15 |
| 4 | 0.27 | <0.15 |
| 5 | <0.15 | <0.15 |
| 6 | <0.15 | <0.15 |
| Copolymer of Example 6(a) | 0.55 | 0.15 |

(*) Powder in KBr

TABLE VIII

| Sample Run number from Table VI Example 6(b) | Melting onset temperature °C | Melting peak maximum temperature °C | End of melting temperature °C | Oxidative decomposition onset temperature °C | Difference between end of melting and oxidative decomposition onset temperature |
|---|---|---|---|---|---|
| 1 | 102.5; 121 | 184.5 | 204.5 | 292.5 | 88 |
| 2 | 224.5 | 256 | 261.5 | 292.5 | 31 |
| 3 | 239 | 279 | 285 | 348 | 63 |
| 4 | 244 | 278 | 282.5 | 352 | 69.5 |
| 5 | 243 | 265 | 272 | 378 | 106 |
| 6 | 236 | 256 | 261 | 424 | 163 |
| Copolymer of Example 6(a) | 246 | 277 | 280 | 316 | 36 |

It will be apparent that some changes in details may be made in practicing the invention. Therefore, we intend to include in the scope of the appended claims all variations which will be obvious to those skilled in the art from the description and working examples given herein.

What we claim is:

1. A process for preparing crystalline ethylene/tetrafluoroethylene copolymers containing from 53 to 63% by moles of tetrafluoroethylene homogeneously distributed along the copolymeric chain axis and among the chains, having a high degree of thermal stability, and showing a temperature gap of at least 80°C, measured by differential thermal analysis, between their ultimate melting temperature and the temperature at which oxidative decomposition of the copolymers begins, said process being characterized in that the starting mixture of ethylene and tetrafluoroethylene which is copolymerized to obtain the copolymers contains more than 78% of tetrafluoroethylene by moles and the concentration of tetrafluoroethylene in the mixture of monomers is maintained above 78% by moles and essentially during the copolymerization reaction.

2. Crystalline copolymers of ethylene and tetrafluoroethylene containing from 53 to 63% by mols of tetrafluoroethylene in which the units derived from the tetrafluoroethylene are distributed essentially homogeneously along the copolymeric chain axis and among the copolymeric chains, said copolymers having a high degree of thermal stability and resistance to oxidation under heating, and being further characterized in that the temperature gap between the ultimate melting temperature thereof and the temperature at which oxidative decomposition of the copolymers begins is at least 80°C, measured by differential thermal analysis.

* * * * *

UNITED STATES PATENT OFFICE
CERTIFICATE OF CORRECTION

Patent No. 3,870,689              Dated  March 11, 1975

Inventor(s) Mario Modena et al

It is certified that error appears in the above-identified patent and that said Letters Patent are hereby corrected as shown below:

Col. 1, the heading is amended to recite:

- - -Claims priority of Italian application No. 16,220, filed May 18, 1967- -.

Col. 1, line 18, the word - - -coefficient- - - is inserted after

- - -friction - - -;

line 19, "difficular" is corrected to - - -difficult- - -.

Col. 2, line 8, "copolymers" is corrected to - - -copolymer- - -.

Col. 4, next to last line, between "far" and "superior", the word "much" is cancelled.

Col. 5, line 59, the words - - -the material- - - are inserted before "showed," (1st word).

Col. 11, line 20, before the word "that" the word "shown" is corrected to - - -show- - -.

Col. 12, line 5, the word "colume" is corrected to - - -column- - -.

Col. 14, line 4, the word "constant" is inserted after "essentially".

Signed and sealed this 27th day of May 1975.

(SEAL)
Attest:

RUTH C. MASON
Attesting Officer

C. MARSHALL DANN
Commissioner of Patents
and Trademarks